US011870815B2

(12) United States Patent
Kaimal et al.

(10) Patent No.: US 11,870,815 B2
(45) Date of Patent: Jan. 9, 2024

(54) SECURITY OF NETWORK TRAFFIC IN A CONTAINERIZED COMPUTING ENVIRONMENT

(71) Applicant: Sophos Limited, Abingdon (GB)

(72) Inventors: Biju Ramachandra Kaimal, Bangalore (IN); Jeffrey Martin Green, Brentwood, TN (US)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 17/749,510

(22) Filed: May 20, 2022

(65) Prior Publication Data

US 2023/0319114 A1 Oct. 5, 2023

(30) Foreign Application Priority Data

Apr. 5, 2022 (IN) .............................. 202211020533

(51) Int. Cl.
*H04L 29/06* (2006.01)
*H04L 9/40* (2022.01)
*G06F 9/455* (2018.01)

(52) U.S. Cl.
CPC .......... *H04L 63/20* (2013.01); *G06F 9/45558* (2013.01); *H04L 63/0209* (2013.01); *G06F 2009/45591* (2013.01); *G06F 2009/45595* (2013.01)

(58) Field of Classification Search
CPC . H04L 63/20; H04L 63/0209; H04L 63/0236; H04L 63/0227; H04L 63/0263; H04L 63/107
USPC ........................................................... 726/9
See application file for complete search history.

(56) References Cited

U.S. PATENT DOCUMENTS 10,721,273 B2\* 7/2020 Rubakha ............. G06F 9/45558
11,172,024 B2\* 11/2021 Hegde ....................... G06F 9/54

FOREIGN PATENT DOCUMENTS

EP 3703330 A1 9/2020

OTHER PUBLICATIONS

International Search Report and Written Opinion in PCT/GB2023/050489 dated Jun. 12, 2023.
Kim, et al. "Flexible network address mapping for container-based clouds" Proceedings of the 2015 1st IEEE Conference on Network Softwarization (NetSoft), Apr. 13, 2015.
"Gatekeeper" 2019, GitHub, Inc., accessed May 19, 2022. https://github.com/open-policy-agent/gatekeeper.

(Continued)

*Primary Examiner* — Longbit Chai
(74) *Attorney, Agent, or Firm* — Schmeiser, Olsen & Watts LLP; Timothy P. Collins

(57) ABSTRACT

A method comprises monitoring a computing environment including a plurality of containers, determining, for one of the containers, a service type and an IP address, assigning the IP address of the container having the determined service type to a first list of IP addresses, assigning an IP address of each of the containers to a second list of IP addresses, applying a first security policy for a first source of network traffic for processing by the container having the determined service type and the IP address assigned to the first list of IP addresses, and applying a second security policy for a second source of network traffic for processing by the containers having the IP addresses assigned to the second list of IP addresses.

20 Claims, 9 Drawing Sheets

(56) References Cited

OTHER PUBLICATIONS

Ducastel, Alexis "Benchmark results of Kubernetes network plugins (CNI) over 10Gbit/s network" ITNEXT, Sep. 8, 2020, accessed May 19, 2022. https://itnext.io/benchmark-results-of-kubernetes-network-plugins-cni-over-10gbit-s-network-updated-august-2020-6e1b757b9e49.

* cited by examiner

SECURITY OF NETWORK TRAFFIC IN A CONTAINERIZED COMPUTING ENVIRONMENT

RELATED APPLICATION

This application claims the benefit of the earlier filing date of Indian Patent Application Serial No. 202211020533 filed Apr. 5, 2022, the entirety of which is incorporated herein by reference.

FIELD

The present disclosure relates to generally to cybersecurity in a containerized computing environment. More specifically, the present disclosure describes systems and methods for applying an appropriate security policy to network traffic to prevent intrusion attempts to the containerized computing environment.

BACKGROUND

Containerized computing environments often include containers that are external facing for communicating with computers outside of the environment, referred to as North-South network traffic, while other containers communicate with each other only within the containerized computing environment, referred to as East-West network traffic. An intrusion protection system (IPS) may be used to monitor East-West network traffic and North-South network traffic to detect malicious traffic patterns by comparing the traffic against a known set of intrusion detection signatures.

Containerized computing environments typically incorporate a network address translation (NAT) feature to prevent IP address conflicts between containers and network devices such as firewalls, load balancers, and the like. However, NAT implementations may provide difficulty in identifying North-South and East-West network traffic based on IP addresses or subnets. For example, public cloud computing environments may have multiple networking devices such as routers, switches, and the like along a data path through which the network traffic flows. These networking devices may share IP addresses and/or subnets with containers receiving the network traffic and/or other infrastructure devices such as load balancers, which can prohibit the identification of East-West network traffic or North-South network traffic based on the IP address subnets. However, East-West and North-South security policies may be different. Therefore, it is desirable for network traffic to be distinguished for the purpose of implementing the appropriate security policy in order to ensure proper security of the containers.

SUMMARY

According to embodiments disclosed herein, a method, and associated computer system and computer program product for processing computer network traffic is provided. According to the method, one or more processors of a computer system monitor a computing environment including a plurality of containers, wherein the plurality of containers are instantiated within a container-based architecture. For one of the containers, a service type and an IP address are determined. The one or more processors of the computer system assign the IP address of the container having the determined service type to a first list of IP addresses. The one or more processors of the computer system assign an IP address of each of the containers to a second list of IP addresses. The one or more processors of the computer system apply a first security policy for a first source of network traffic between the at least one container and a device external to the container-based architecture for processing by the container having the determined service type and the IP address assigned to the first list of IP addresses. The one or more processors of the computer system apply a second security policy for a second source of network traffic between the plurality of containers within the container-based architecture for processing by the containers having the IP addresses assigned to the second list of IP addresses.

BRIEF DESCRIPTION OF THE DRAWINGS

The above and further advantages of the foregoing may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the disclosed concepts and features.

DETAILED DESCRIPTION

Figure 1:
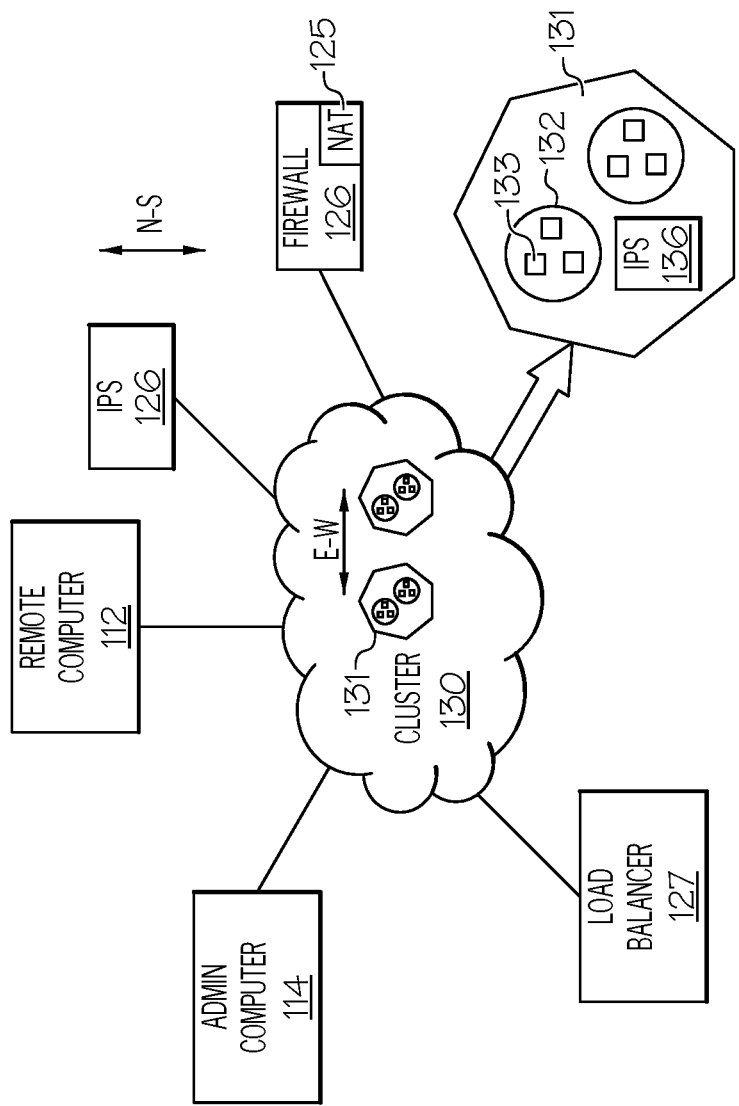
FIG. 1 is a block diagram of a containerized computing environment according to an example embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location unless a different meaning is explicitly provided or otherwise clear from the context.

Embodiments herein describe a containerized computing environment, which includes a container security system that permits an IPS to detect or protect against known or potential threats with respect to different types of network traffic. In particular, the container security system is applied to a container orchestration platform, which automates the deployment, scaling, and management of containerized applications, generally referred to as containers. In particular, the container security system can distinguish IP addresses of containerized applications arranged in a cluster in the containerized computing environment intended for one type of network traffic (e.g., North-South network traffic to and from devices external to a containerized application cluster) from IP addresses of containerized applications intended for another type of network traffic (e.g., East-West network traffic between pods in the cluster). An IPS of the container security system can apply one set of rules, policies, or the like to the North-South network traffic and apply a different set of IPS rules, policies, or the like to the East-West network traffic. An administrator can protect the pods running in a container cluster against known traffic attack signatures and can set different IPS policies for different types of traffic based on the software in the path of the respective traffic profiles. This feature can operate in the presence of NAT devices, which may otherwise cause difficulty in conventional configurations with respect to identifying North-South and East-West network traffic based on IP addresses or subnets. In addition, default rules or recommended action of an IPS rule set can be changed for a new container that accommodates the role or function of the container according to a type of traffic intended for receipt by the container. Another feature is that Snort rules or the like can be automatically updated to the most recent signature set.

FIG. 1 is a block diagram of a containerized computing environment 100. The containerized computing environment 100 may include at least one cluster 130 of a container orchestration architecture that communicates with a remote computer 112 and/or a central administrator computer 114, and also provides a computing infrastructure of interacting software, network, and data storage elements that permit the container orchestration architecture to modernize, for example, a scaling of, the infrastructure. The environment 100 may also include a combination of one or more firewalls 124, IPS devices 126, 136, switches, routers, hubs, and the like as part of a container security system for providing provide security to the containerized applications 133 of the cluster 130. Other network devices such as a NAT device 125, e.g., part of a firewall 124 and load balancing apparatus 127, or load balancer, can be part of the environment 100. The containerized computing environment 100 may be part of or otherwise in electronic communication with a threat management facility, such as the threat management facility 600 shown in FIG. 6 and described below.

The container orchestration architecture including the cluster(s) 130 may be an open-source platform such as a Kubernetes K8S Container Orchestration platform, a RedHat OpenShift Container Platform, and the like, but not limited thereto. As shown in FIG. 1, the cluster 130 can include a grouping of nodes 131 that run the containerized applications 133 in a scalable manner. The containerized applications 133 may be arranged into pods 132, thereby permitting the containers 133 to share storage and network resources. The pods 132 within the cluster 130 can include processes that control the operation of the containers 133. Nodes, pods, and clusters are terms well-known to a Kubernetes architecture. Although they are described herein by way of example, other container orchestration platforms may equally apply to the embodiments herein, which may include different terminology and configurations.

During operation, East-West network traffic may be exchanged between nodes 131 of the cluster 130 and/or North-South network traffic may be exchanged between nodes 131 and electronic devices external to the cluster 130. A router or related network device (e.g., hub, switch, and so on) (not shown) may be positioned between the containerized computing environment 100 and an outside network such as the Internet. The firewall 124 and IPS 126, 136 are arranged to protect the container applications 133 from malicious traffic patterns. IPS 126 may be external to the cluster 130 and IPS 136 may be part of the cluster 130.

The load balancing apparatus 127 is configured to distribute network traffic exchanged between remote applications and the pods 132 among multiple backend services.

The central administrator computer 114 permits a user to manage and control security-related aspects of the containerized computing environment 100, including protecting the pods 132 of the cluster 130 against known traffic attack signatures by deploying a container-specific IPS rule set to the cluster 130. The central administrator computer 114 can also modify and/or change a recommended action for the IPS rule set.

Figure 2:
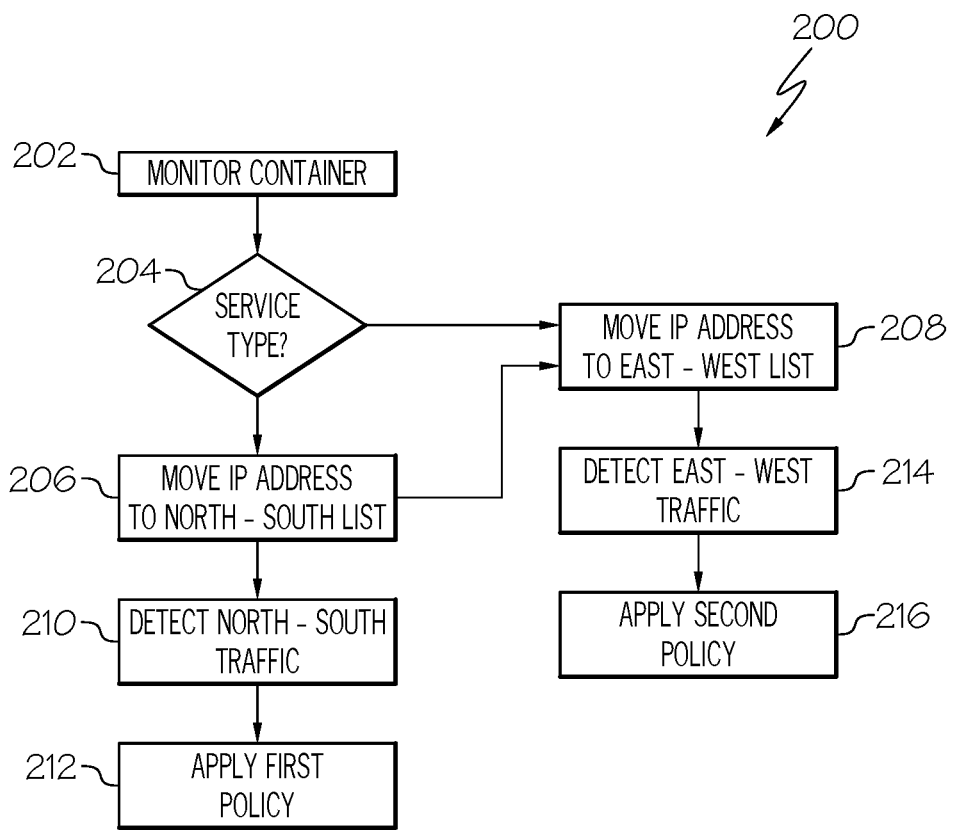
FIG. 2 is a flowchart of a method for processing computer network traffic in a containerized computing environment according to an example embodiment.

FIG. 2 is a flowchart of a method 200 for processing computer network traffic in a containerized computing environment, in accordance with some embodiments. In describing the method 200, reference is made to elements of the containerized computing environment 100 of FIG. 1 described above and the container security system 300 of FIG. 3 described below.

The method 200 begins at block 202, where an IP configuration service module of the security monitors a container cluster 130 for IP addresses and service types of the pods 132 of the cluster 130. In some embodiments, the IP address of a pod 132 is shared by all containers 133 running within the pod 132 and can connect them to other pods 133 running in the cluster 130 and/or devices external to the customer 130. In some embodiments, the IP address pertains to the node 131 to which a given pod 132 corresponds.

At decision diamond 204, a determination can be made whether a node 131, pod 132 or container 133 of interest has a particular service type. In some embodiments, a service type may be a NodePort service type, which when configured by the central administrator computer 114 provides an open port on those worker nodes 131 in the cluster 130 that have a pod 132 for that particular service. When external traffic is received on the open port, the traffic is directed to a specific container 133 for the service that the port is representing. In some embodiments, a service type is a LoadBalancer service type, which exposes the service externally using the load balancing apparatus 127 to which one or more load balancer routes are created, which permits the load balancing apparatus 127 to spread external traffic out across the nodes 131. This feature can address multi-node cluster configurations that have complex internal routing schemes.

If at decision diamond 204 a determination is made that the node 131, pod 132 or container 133 has a particular service type, then the method 200 proceeds to block 206, where the IP address of the corresponding pod 132 is assigned to a list of IP addresses of containers 133 configured for receiving network traffic external to the cluster 130, e.g., North-South network traffic. If at decision diamond 204 a determination is made that a monitored node 131, pod 132 or container 133 does not have the service type of interest, then the method 200 proceeds to block 208 where the IP address of the pod 132 is assigned to a list of IP addresses of containers configured for receiving network traffic within the cluster 130, e.g., East-West network traffic. In some embodiments, the method 200 may also proceed from to block 208 where the IP address of a pod 132 having the particular service type can also be assigned to the list of IP addresses for receiving network traffic within the cluster 130. Accordingly, all pod IP addresses can be tracked separately to monitor for East-West network traffic, although some of these pod IP addresses may also be monitored for North-South traffic.

At block 210, the container security system may detect a source of North-South network traffic directed at a container 133 having the particular service type. At block 212, the container security system can apply a first policy to the North-South network traffic. At block 214, the container security system may detect a source of East-West network traffic directed at a container 133 of the pod 132 having an IP address assigned to the list of East-West IP addresses. At block 216, the container security system can apply a second policy to the East-West network traffic. The first and second security policies may include firewall policies for controlling the network traffic between a container and a device external to the container-based architecture or between the plurality of containers in an East-West direction, or web application firewall (WAF) policies for protecting web workloads deployed in the plurality of containers, or IPS policies for alerting or removing the network traffic determined to be indicators of malicious activity, or a combination thereof.

Figure 3:
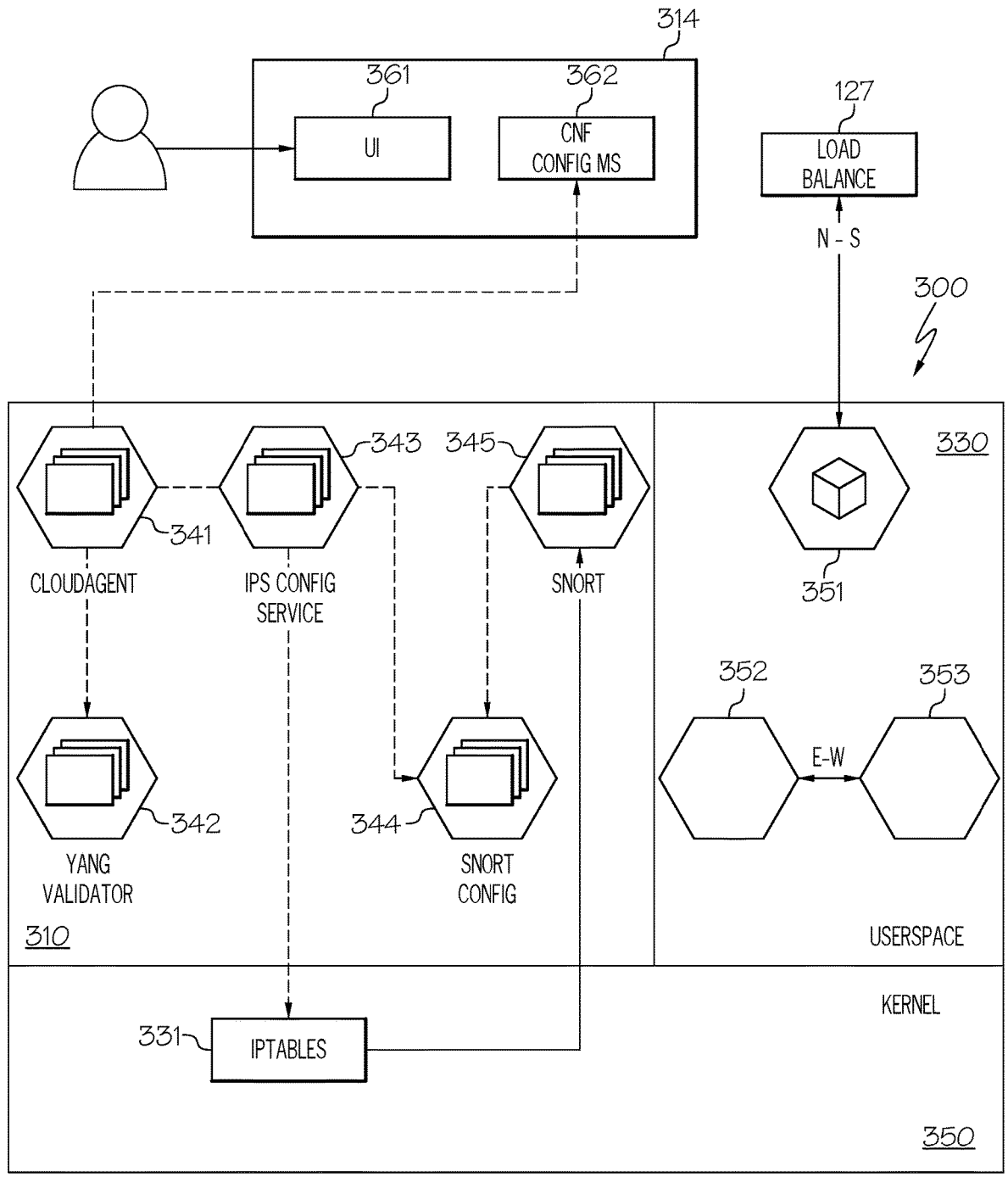
FIG. 3 is a block diagram of selected components of a container IPS system of a containerized computing environment according to an example embodiment.

FIG. 3 is a block diagram of selected components of a container security system 300 of a containerized computing environment, in accordance with some embodiments. In some embodiments, the container security system is part of the containerized computing environment 100 of FIG. 1. For example, elements of the container security system 300 of FIG. 3 may be implemented in the firewall 124 of FIG. 1. Here, the IPS 344 of FIG. 3 may be similar to the IPS 136 of FIG. 1.

In some embodiments, the container security system 300 may include an IPS manager 310 and an administrator system 314, for example, similar to the central administrator computer 114 of FIG. 1. The IPS manager 310 can communicate with one or more container clusters 330, and both the IPS manager 310 and the cluster(s) 330 run on an operating system 350, for example, a Linux kernel. In some embodiments, the operating system 350 may be installed on the nodes for running the cluster(s) 330, which permits the containers to share access to the operating system 350 to virtually package and isolate applications for deployment without the need for virtual machines. The cluster(s) 330 can be part of a container orchestration platform for hosting a plurality of cluster pods 351-353 comprising container workloads. In some embodiments, the cluster(s) 330 are container firewall clusters protected by the IPS manager 310. The IP addresses of the workloads may change during deployment. The IPS manager 310 can be deployed into a customer's container orchestration environment and protect the workloads running on the container orchestration platform.

In some embodiments, the operating system 350 processes a set of IP Tables 331, which store a set of rules for directing network traffic to the IPS 344. In some embodiments, the IP Table rules can be provided by an external controller such as the administrator system 314. In some embodiments, other computer programs can execute at a Linux kernel or the like for directing network traffic to the IPS 136, such as eBPF programs or the like. This may include event-driven programs that are executed when the kernel passes a predefined hook such as a system call, kernel tracepoint, network event, and so on. In some embodiments, the IPS manager 310 includes an administrator interface module 341, an IPS configuration service module 343, and an IPS 344, which can be deployed in a container orchestration platform, for example, a platform including the cluster pods 351-353.

The administrator interface module 341 provides an interface between the administrator system 314 and the cluster(s) 330 for receiving container-related policies and the above-mentioned IP Table rules for providing traffic-specific security with respect to the cluster pods 351-353. In some embodiments, the administrator interface module 341 generates rule information pertaining to IPS policies or the like, which is provided as configuration change data to a new cluster. For example, when another cluster is added for management by the container security system 300, default rules are generated and provided by the administrator computer 314 for the new cluster. The configuration change data generated for the customer includes the IPS rules selected by a set of filters that are part of a default traffic policy, for example, North-South and/or East-West network traffic policy. The filters as part of a policy definition can be used to select signatures of interest from a master signature database (not shown), which may be part of the container security system 300. The filters may be part of a policy definition of a default traffic policy, which may also include the name, description, and/or list of actions to override for specific signatures. The configuration change data can be validated by a YANG validator 342 or the like.

In some embodiments, the IPS configuration service module 343 assigns IP addresses of cluster pods 351-353 to a traffic-specific list of IP addresses, for example, a first list designated for IF addresses of pods having a service type of NodeType or Loadbalancer, or a second list designed for all container IP addresses. The IPS configuration service module 343 can communicate with the administrator interface module 341 to provide the configuration change data to an IP Table 331 of the operating system 350. The IPS configuration service module 343 can be migrated by the container orchestration platform from one node to another node in case of failure.

The IPS 344 can detect and protect the cluster(s) 330 against malicious traffic. IPS policies can be applied based on traffic source/destination, for example, North-South (N-S) or East-West (E-W). The IPS 344 communicates with the IPS configuration service module 343 to monitor the cluster pods 351, 352, 353, in particular, monitoring for IP addresses and particular services establishing that the container firewall cluster pods 351-353 are configured to receive North-South and/or East-West network traffic.

As described above, the administrator system 314 can add new clusters under a container orchestration platform and for providing container security features such as traffic policies for the IPS 344. In some embodiments, the administrator system 314 includes a user interface 361 and a container firewall configuration module 362. The user interface 361 permits an administrator or other user to manage the IPS rules, add, remove, or modify clusters, and the like. The container firewall configuration module 362 can generate configuration change data for a cluster. The configuration change data can include IPS rules. The IPS rules can be selected by filters that are part of predetermined traffic policies, for example, established by the administrator.

Figure 4:
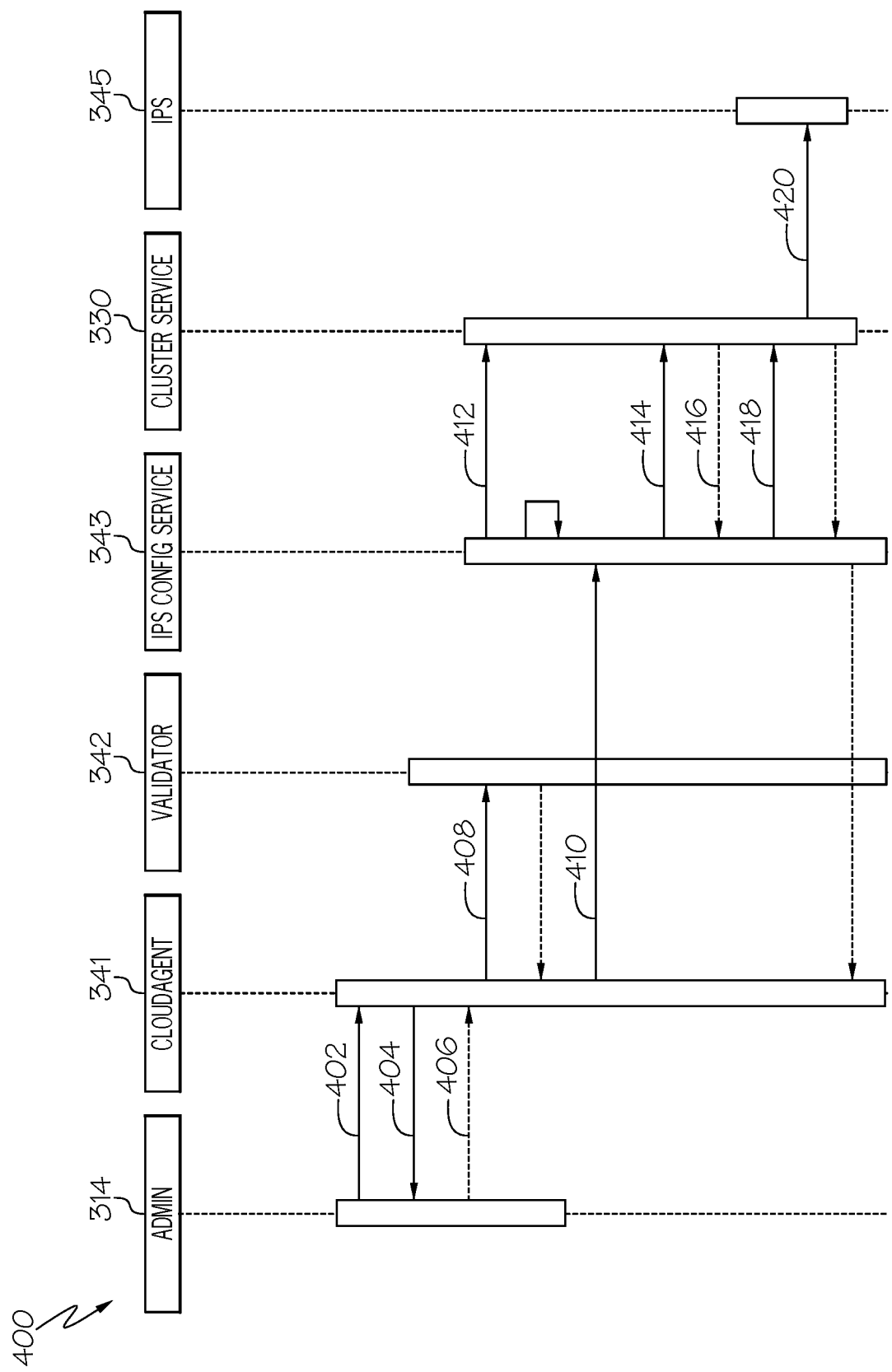
FIG. 4 is an illustration of a method including flow paths between elements of a containerized computing environment according to an example embodiment.

FIG. 4 is an illustration of a method 400 including flow paths between elements of a containerized computing environment, according to an example embodiment. The method 400 may be performable by, for example, the one or more computer systems and/or processors of the container security system 300 of FIG. 3.

During operation, configuration change push notification may be provided (402) from the administrator system 314 to the administrator interface module 341, for example, commensurate with an administrator adding a new cluster under a container orchestration platform. For example, a container firewall cluster can be added to a plurality of present containers deployed in a container orchestration environment for providing functionality intended to protect the workload running on the container orchestration platform.

The administrator interface module 341 may send (404) a configuration change data request to the administrator system 314. In response to the request, the administrator system 314 sends (406) the configuration change data to the administrator interface module 341. The administrator interface module 341 in turn sends a request to the validator 342 to validate (408) the configuration. After the data is validated, the administrator interface module 341 sends (410) a configuration activation (set config) command to the IPS configuration service module 343, which is used by the IPS configuration service module 343 to apply IPS rules of interest to a configuration map, which stores the IPS-related data for use by the container(s). For example, Snort rules can be applied to a configuration map object. Accordingly, the IPS configuration service module 343 may watch (412) for services and IP addresses of the container pods via an API server or the like of the container orchestration platform. IP variables can be set (414) in the IPS 344 so that the IP addresses of the container having a NodePort, LoadBalancer, or related service type can be assigned to a list of IP addresses of containers configured for receiving network traffic external to the cluster.

The configuration map is created (416) to which the IPS configuration service module 343 can apply the relevant rules specific to the type of network traffic directed for the cluster. The pod is restarted (418), and the pod may be launched (420) where the IPS 344 sniffs incoming packets directed to the container based on its IP address according to the rules specific to the incoming packets.

Figure 5:
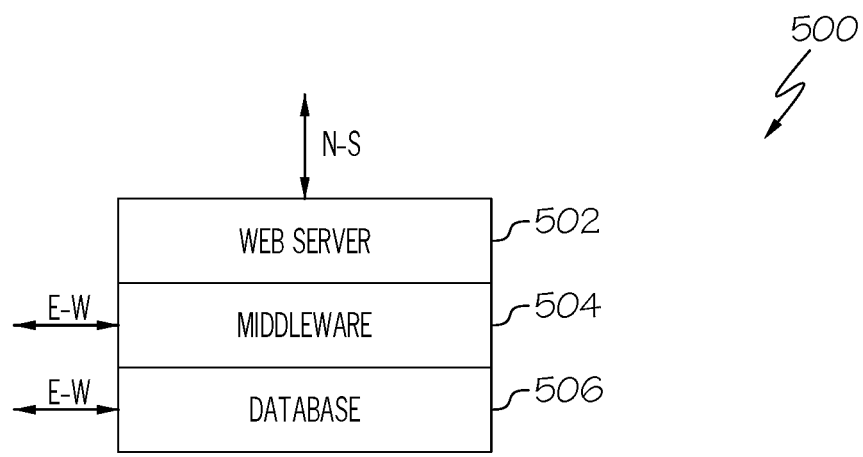
FIG. 5 is a block diagram of a web-based software application that is processed by a computer system of the containerized computing environment according to an example embodiment.

FIG. 5 is a block diagram of a web-based software application 500 that is processed by a computer system of the containerized computing environment, according to an example embodiment. The web-based software application 500 can be stored and executed by a computer such as the computing device 700 of FIG. 7. The software application 500 may include a webserver container 502, a middleware container 504, and a database container 506. North-South network traffic may be exchanged between the web server container 502 and external computing devices. East-West network traffic may be exchanged between the middleware container 504 and other computing devices within a cluster or related containerized computing environment. Similarly, East-West network traffic may be exchanged between the database container 506 and external computing devices. Each of the webserver container 502, middleware container 504, and database container 506 has an IP address. The IP address of the webserver container 502 can be stored in a list of North-South network IP addresses. The IP addresses of the webserver container 502, middleware container 504, and database container 506 can be stored in a list of east-east network IP addresses. Accordingly, an administrator can set different security policies for the North-South and East-West network traffic based on the web-based software application that would be in the path of the respective traffic profiles. For example, one particular security policy, e.g., part of an IPS set of rules, may be directed at the North-South network traffic intended for receipt by the webserver container 502 based on the list of North-South IP addresses. A different security policy, e.g., part of an IPS set of rules, may be directed at the East-West traffic intended for receipt by the middleware container 504 or database container 506, or the webserver container 502 based on the list of East-West IP addresses.

The foregoing systems, devices, and methods thereby provide a mechanism by which container cluster administration can be performed by a network administrator or other entity, who desired to institute an appropriate security policy for particular traffic types, such as North-South and East-West network traffic directed to particular containers. The described technologies may be particularly useful in applying security rules for execution by an IPS or firewall. In a typical network, there may be a NAT device allows many devices on a network to share an IP address, which prohibits North-South and East-West network traffic from being identified and distinguished solely on IP addresses or subnets. Traditional which typical use IP addresses for identifying workloads and use them as identifiers in policies do not work well in such an environment because they do not have visibility into the traffic between the pods or traffic destined for an external facing pod in a container environment. Thus, embodiments described herein can apply rules-based or policy-based changes to an IPS or related security device for specific traffic based on the list in which the IP address is located. These technologies, and others described herein, increase the overall security within an organization's digital environment by allowing one set of IPS rules to be applied to North-South network traffic intended for a container, and a different set of IPS rules to be applied to East-West network traffic for the container.

Figure 6:
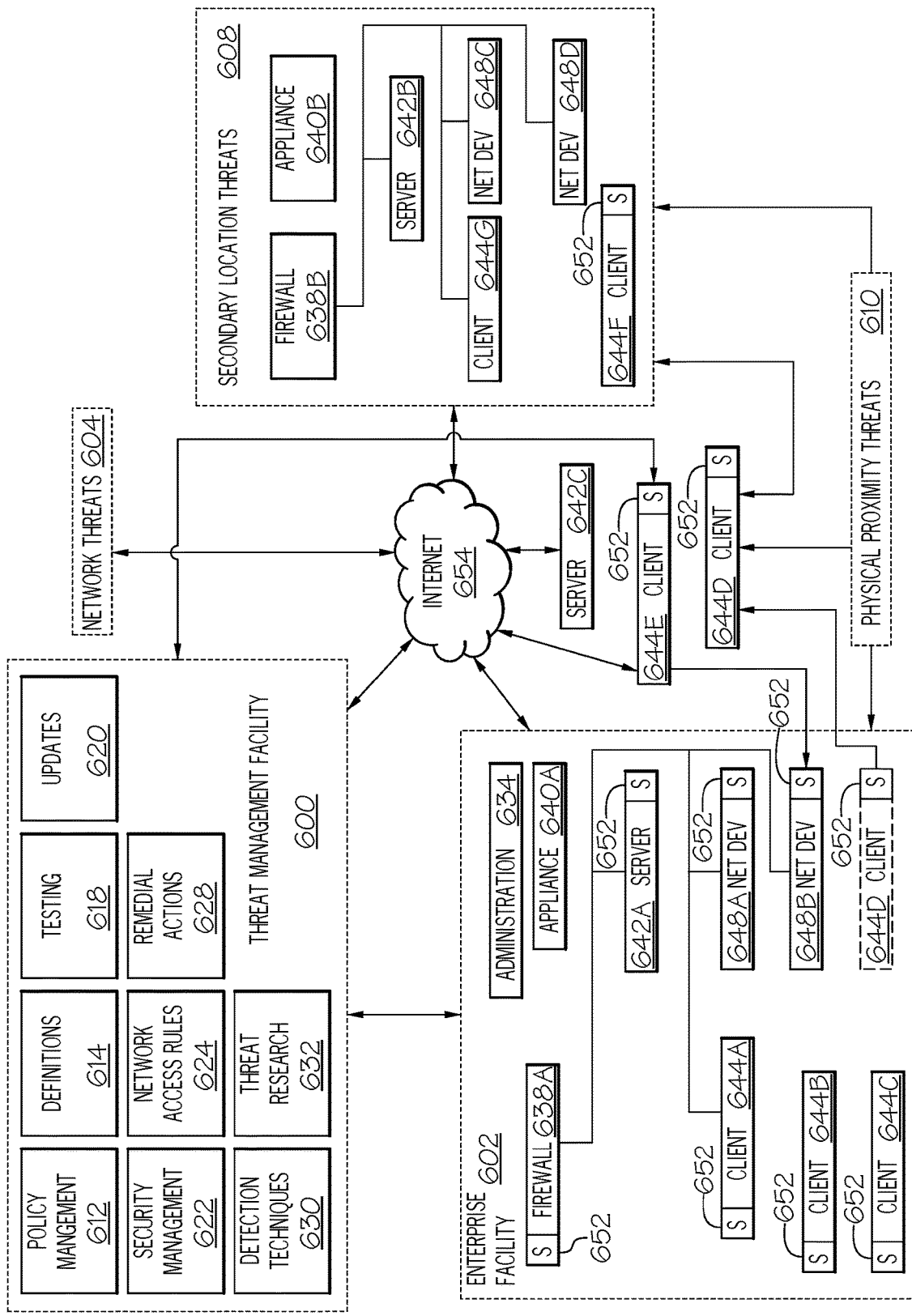
FIG. 6 illustrates an environment for threat management according to an example embodiment.

FIG. 6 illustrates an environment for threat management. Specifically, FIG. 6 depicts a block diagram of a threat management facility 600 providing protection to one or more enterprises, networks, locations, users, businesses, etc. against a variety of threats—a context in which the techniques described above may usefully be deployed. The threat management facility 600 may be used to protect devices and assets (e.g., IoT devices or other devices) from computer-generated and human-generated threats. For example, a corporation, school, web site, homeowner, network administrator, or other entity may institute and enforce one or more policies that control or prevents certain network users (e.g., employees, residents, users, guests, etc.) from accessing certain types of applications, devices, resources generally or in a particular manner. Policies may be created, deployed and managed, for example, through the threat management facility 600, which may update and monitor network devices, users, and assets accordingly.

The threat of malware or other compromises may be present at various points within a network 602 such as laptops, desktops, servers, gateways, communication ports, handheld or mobile devices, IoT devices, firewalls. In addition to controlling or stopping malicious code, a threat management facility 600 may provide policy management to control devices, applications, or users that might otherwise undermine productivity and network performance within the network 602.

The threat management facility 600 may provide protection to network 602 from computer-based malware, including viruses, spyware, adware, Trojans, intrusion, spam, policy abuse, advanced persistent threats, uncontrolled access, and the like. In general, the network 602 may be any networked computer-based infrastructure or the like managed by a threat management facility 602, such as an organization, association, institution, or the like, or a cloud-based facility that is available for subscription by individuals. For example, the network 602 may be a corporate, commercial, educational, governmental, or other network 602, and may include multiple networks, computing resources, and other facilities, may be distributed among more than one geographical location, and may include administration 634, a firewall 638A, an appliance 640A, a server 642A, network devices 648A-B, clients 644A-D, such as IoT devices or other devices. It will be understood that any reference herein to a client or client facilities may include the clients 644A-D shown in FIG. 6 and vice-versa.

The threat management facility 600 may include computers, software, or other computing facilities supporting a plurality of functions, such as security management facility 622, policy management facility 612, update facility 620, a definitions facility 614, network access rules facility 624, remedial action facility 628, detection techniques facility 630, testing facility 618, a threat research facility 632, and the like. In embodiments, the threat protection provided by the threat management facility 600 may extend beyond the network boundaries of the network 602 to include clients 644D (or client facilities) that have moved into network connectivity not directly associated with or controlled by the network 602. Threats to client facilities may come from a variety of sources, such as from network threats 604, physical proximity threats 610, secondary location threats 608, and the like. Clients 644A-D may be protected from threats even when the client 644A-D is not directly connected or in association with the network 602, such as when a client 644E-F moves in and out of the network 602, for example when interfacing with an unprotected server 642C through the Internet 654, when a client 644F is moving into a secondary location threat 608 network such as interfacing with components 640B, 642B, 648C, 648D that are not protected, and the like.

The threat management facility 600 may use or may be included in an integrated system approach to provide network 602 protection from a plurality of threats to device resources in a plurality of locations and network configurations. The threat management facility 600 may also or instead be deployed as a stand-alone solution. For example, some or all of the threat management facility 600 components may be integrated into a server or servers at a remote location, for example in a cloud computing facility. For example, some or all of the threat management facility 600 components may be integrated into a firewall, gateway, or access point within or at the border of the network 602. In some embodiments, the threat management facility 600 may be integrated into a product, such as a third-party product, e.g., through an application programming interface, which may be deployed on endpoints, on remote servers, on internal servers or gateways for a network, or some combination of these.

The security management facility 622 may include a plurality of elements that provide protection from malware to network 602 device resources in a variety of ways including endpoint security and control, email security and control, web security and control, reputation-based filtering, control of unauthorized users, control of guest and non-compliant computers, and the like. The security management facility 622 may include a local software application that provides protection to one or more network 602 devices. The security management facility 622 may have the ability to scan client facility files for malicious code, remove or quarantine certain applications and files, prevent certain actions, perform remedial actions and perform other security measures. This may include scanning some or all of the files stored on the client facility or accessed by the client facility on a periodic basis, scanning an application when the application is executed, scanning data (e.g., files or other communication) in transit to or from a device, etc. The scanning of applications and files may be performed to detect known or unknown malicious code or unwanted applications.

The security management facility 622 may provide email security and control. The security management facility 622 may also or instead provide for web security and control, such as by helping to detect or block viruses, spyware, malware, unwanted applications, and the like, or by helping to control web browsing activity originating from client devices. In an embodiment, the security management facility

622 may provide for network access control, which may provide control over network connections. In addition, network access control may control access to virtual private networks (VPN) that provide communications networks tunneled through other networks. The security management facility 622 may provide host intrusion prevention through behavioral based protection, which may guard against known or unknown threats by analyzing behavior before or while code executes. The security management facility 622 may provide reputation filtering, which may target or identify sources of code.

In embodiments, the security management facility 622 may provide secure network connections in a network having a network switch (e.g., according to the methods described above regarding FIGS. 3-6). This aspect of the security management facility may also take place on the firewall 638A (e.g., an access point) or appliance 640A.

In general, the security management facility 622 may support overall security of the network 602 using the various techniques described above, optionally as supplemented by updates of malicious code information and so forth for distribution across the network 602.

The administration facility 634 may provide control over the security management facility 622 when updates are performed. Information from the security management facility 622 may also be sent from the enterprise back to a third party, a vendor, or the like, which may lead to improved performance of the threat management facility 600.

The threat management facility 600 may include a policy management facility 612 configured to take actions, such as to block applications, users, communications, devices, and so on based on determinations made. The policy management facility 612 may employ a set of rules or policies that determine network 602 access permissions for a client 644. In an embodiment, a policy database may include a block list, a blacklist, an allowed list, a whitelist, or the like, or combinations of the foregoing, which may provide a list of resources internal or external to the network 602 that may or may not be accessed by client devices 644. The policy management facility 612 may also or instead include rule-based filtering of access requests or resource requests, or other suitable techniques for controlling access to resources consistent with a corresponding policy.

In embodiments, the policy management facility 612 may include secure network connections in a network environment. The policy management facility may include policies to permit or deny access, to take remedial action, to issue alerts, and so on based on particular device health determinations.

The policy management facility 612 may also or instead provide configuration policies to be used to compare and control the configuration of applications, operating systems, hardware, devices, network associated with the network 602. An evolving threat environment may dictate timely updates, and thus an update management facility 620 may also be provided by the threat management facility 600. In addition, a policy management facility 612 may require update management (e.g., as provided by the update facility 620 herein described). In embodiments, the update management facility 620 may provide for patch management or other software updating, version control, and so forth.

The security facility 622 and policy management facility 612 may push information to the network 602 and/or a given client 644. The network 602 and/or client 644 may also or instead request information from the security facility 622 and/or policy management facility 612, network server facilities 642, or there may be a combination of pushing and pulling of information. In an embodiment, the policy management facility 612 and the security facility 622 management update modules may work in concert to provide information to the network 602 and/or client 644 facility for control of applications, devices, users, and so on.

As threats are identified and characterized, the threat management facility 600 may create updates that may be used to allow the threat management facility 600 to detect and remediate malicious software, unwanted applications, configuration and policy changes, and the like. The threat definition facility 614 may contain threat identification updates, also referred to as definition files. A definition file may be a virus identity file that may include definitions of known or potential malicious code. The virus identity definition files may provide information that may identify malicious code within files, applications, or the like. The definition files may be accessed by security management facility 622 when scanning files or applications within the client facility for the determination of malicious code that may be within the file or application. A definition management facility may include a definition for a neural network or other recognition engine. A definition management facility 614 may provide timely updates of definition files information to the network, client facilities, and the like.

The security management facility 622 may be used to scan an outgoing file and verify that the outgoing file is permitted to be transmitted per the enterprise facility 602 rules and policies. By checking outgoing files, the security management facility 622 may be able to discover malicious code infected files that were not detected as incoming files.

The threat management facility 600 may provide controlled access to the network 602. A network access rules facility 624 may be responsible for determining if a client facility 644 application should be granted access to a requested network resource. In an embodiment, the network access rules facility 624 may verify access rights for client facilities 644 to or from the network 602 or may verify access rights of computer facilities to or from external networks. When network access for a client facility is denied, the network access rules facility 624 may send an information file to the client facility, e.g., a command or command file that the remedial action facility 628 may access and take action upon. The network access rules facility 624 may include one or more databases that may include a block list, a blacklist, an allowed list, a whitelist, a reputation list, an unacceptable network resource database, an acceptable network resource database, a network resource reputation database, or the like. The network access rules facility 624 may incorporate rule evaluation. Rule evaluation may, for example, parse network access requests and apply the parsed information to network access rules. The network access rule facility 624 may also or instead provide updated rules and policies to the enterprise facility 602.

When a threat or policy violation is detected by the threat management facility 600, the threat management facility 600 may perform or initiate remedial action through a remedial action facility 628. Remedial action may take a variety of forms, such as terminating or modifying an ongoing process or interaction, issuing an alert, sending a warning to a client or administration facility 634 of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on the client facility 644, quarantining a related application (or files, processes or the like), terminating the application or device, isolating the application or device, moving a process or application code to a sandbox for evaluation, isolating the client facility 644 to a location or status within the network that restricts network access, blocking a network access port from a client facility 644, reporting the application to an administration facility 634, or the like, as well as any combination of the foregoing.

Remedial action may be provided as a result of a detection of a threat or violation. The detection techniques facility 630 may include tools for monitoring the network or managed devices within the network 602. The detection techniques facility 630 may provide functions such as monitoring activity and stored files on computing facilities. Detection techniques, such as scanning a computer's stored files, may provide the capability of checking files for stored threats, either in the active or passive state. Detection techniques such as streaming file management may be used to check files received at the network, a gateway facility, a client facility, and the like.

Verifying that the threat management facility 600 detects threats and violations to established policy, may require the ability to test the system, either at the system level or for a particular computing component. The testing facility 618 may allow the administration facility 434 to coordinate the testing of the security configurations of client facility computing facilities on a network. For example, the administration facility 634 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 634. The administration facility 634 may be able to determine the level of preparedness of the client facility 644 based on the reported information. Remedial action may be taken for any of the client facilities 644 as determined by the administration facility 634.

The threat management facility 600 may provide threat protection across the network 602 to devices such as clients 644, a server facility 642, an administration facility 634, a firewall 638, a gateway, one or more network devices (e.g., hubs and routers 648, a threat management or other appliance 640, any number of desktop or mobile users, and the like. As used herein the term endpoint may refer to any compute instance running on a device that can source data, receive data, evaluate data, buffer data, process data or the like (such as a user's desktop computer, laptop, IoT device, server, etc.). This may, for example, include any client devices as well as other network devices and the like within the network 602, such as a firewall or gateway (as a data evaluation endpoint computer system), a laptop (as a mobile endpoint computer), a tablet (as a hand-held endpoint computer), a mobile phone, or the like. The term endpoint may also or instead refer to any final or intermediate source or destination for data within a network 602. The endpoint computer security facility 652 may be an application locally loaded onto any corresponding computer platform or computer support component, either for local security functions or for management by the threat management facility 600 or other remote resource, or any combination of these.

The network 602 may include a plurality of client facility computing platforms on which the endpoint computer security facility 652 is installed. A client facility computing platform may be a computer system that is able to access a service on another computer, such as a server facility 642, via a network. The endpoint computer security facility 652 may, in corresponding fashion, provide security in any suitable context such as among a plurality of networked applications, for a client facility connecting to an application server facility 642, for a web browser client facility connecting to a web server facility 642, for an e-mail client facility retrieving e-mail from an Internet 654 service provider's mail storage servers 642 or web site, and the like, as well as any variations or combinations of the foregoing.

The network 602 may include one or more of a variety of server facilities 642, such as application servers, communications servers, file servers, database servers, proxy servers, mail servers, fax servers, game servers, web servers, and the like. A server facility 642, which may also be referred to as a server facility 642 application, server facility 642 operating system, server facility 642 computer, or the like, may be any device(s), application program(s), operating system(s), or combination of the foregoing that accepts client facility connections in order to service requests from clients 644. In embodiments, the threat management facility 600 may provide threat protection to server facilities 642 within the network 602 as load conditions and application changes are made.

A server facility 642 may include an appliance facility 640, where the appliance facility 640 provides specific services to other devices on the network. Simple server facility 642 appliances may also be utilized across the network 602 infrastructure, such as switches, routers, hubs, gateways, print servers, modems, and the like. These appliances may provide interconnection services within the network 602, and therefore may advance the spread of a threat if not properly protected.

A client facility 644 may be protected from threats from within the network 602 using a local or personal firewall, which may be a hardware firewall, software firewall, or combination, that controls network traffic to and from a client. The local firewall may permit or deny communications based on a security policy. Another component that may be protected by an endpoint computer security facility 652 is a network firewall facility 638, which may include hardware or software, in a standalone device or integrated with another network component, which may be configured to permit, deny, or proxy data through a network 602.

The interface between the threat management facility 600 and the network 602, and through the appliance facility 640 to embedded endpoint computer security facilities, may include a set of tools that may be the same or different for various implementations, and may allow each network administrator to implement custom controls. In embodiments, these controls may include both automatic actions and managed actions. The administration facility 634 may configure policy rules that determine interactions. The administration facility 634 may also establish license management, which in turn may further determine interactions associated with licensed applications. In embodiments, interactions between the threat management facility 600 and the network 602 may provide threat protection to the network 602 by managing the flow of network data into and out of the network 602 through automatic actions that may be configured by the threat management facility 600 for example by action or configuration of the administration facility 634.

Client facilities 644 within the network 602 may be connected to the network 602 by way of wired network facilities 648A or wireless network facilities 648B. Mobile wireless facility clients 644, because of their ability to connect to a wireless network access point, may connect to the Internet 654 outside the physical boundary of the network 602, and therefore outside the threat-protected environment of the network 602. Such a client 644, if not for the presence of a locally installed endpoint computer security facility 652, may be exposed to a malware attack or perform actions counter to network 602 policies. Thus, the endpoint computer security facility 652 may provide local protection against various threats and policy violations. The threat management facility 600 may also or instead be configured to protect the out-of-enterprise facility 602 mobile client facility (e.g., the clients 644) through interactions over the Internet 654 (or other network) with the locally installed endpoint computer security facility 652. Thus, mobile client facilities that are components of the network 602 but temporarily outside connectivity with the network 602 may be provided with the threat protection and policy control the same as or similar to client facilities 644 inside the network 602. In addition, mobile client facilities 644 may receive the same interactions to and from the threat management facility 600 as client facilities 644 inside the enterprise facility 602, such as by receiving the same or equivalent services via an embedded endpoint computer security facility 652.

Interactions between the threat management facility 600 and the components of the network 602, including mobile client facility extensions of the network 602, may ultimately be connected through the Internet 654 or any other network or combination of networks. Security-related or policy-related downloads and upgrades to the network 602 may be passed from the threat management facility 600 through to components of the network 602 equipped with the endpoint computer security facility 652. In turn, the endpoint computer security facility 652 components of the enterprise facility or network 602 may upload policy and access requests back across the Internet 654 and through to the threat management facility 600. The Internet 654 however, is also the path through which threats may be transmitted from their source, and an endpoint computer security facility 652 may be configured to protect a device outside the network 602 through locally deployed protective measures and through suitable interactions with the threat management facility 600.

Thus, if the mobile client facility were to attempt to connect into an unprotected connection point, such as at a secondary location 608 hat is not a part of the network 602, the mobile client facility 644 may be required to request network interactions through the threat management facility 600, where contacting the threat management facility 600 may be performed prior to any other network action. In embodiments, the client facility's 644 endpoint computer security facility 652 may manage actions in unprotected network environments such as when the client facility (e.g., client 644F) is in a secondary location 608, where the endpoint computer security facility 652 may dictate what applications, actions, resources, users, etc. are allowed, blocked, modified, or the like.

The secondary location 608 may have no endpoint computer security facilities 652 as a part of its components, such as its firewalls 638B, servers 642B, clients 644G, hubs and routers 648C-D, and the like. As a result, the components of the secondary location 608 may be open to threat attacks, and become potential sources of threats, as well as any mobile enterprise facility clients 644B-F that may be connected to the secondary location's 608 network. In this instance, these components may now unknowingly spread a threat to other connected to the network 602.

Some threats do not come directly from the Internet 654. For example, a physical proximity threat 610 may be deployed on a client device while that device is connected to an unprotected network connection outside the enterprise facility 602, and when the device is subsequently connected to a client 644 on the network 602, the device can deploy the malware or otherwise pose a threat. In embodiments, the endpoint computer security facility 652 may protect the network 602 against these types of physical proximity threats 610, for instance, through scanning any device prior to allowing data transfers, through security validation certificates, through establishing a safe zone within the network 602 to receive data for evaluation, and the like.

Figure 7:
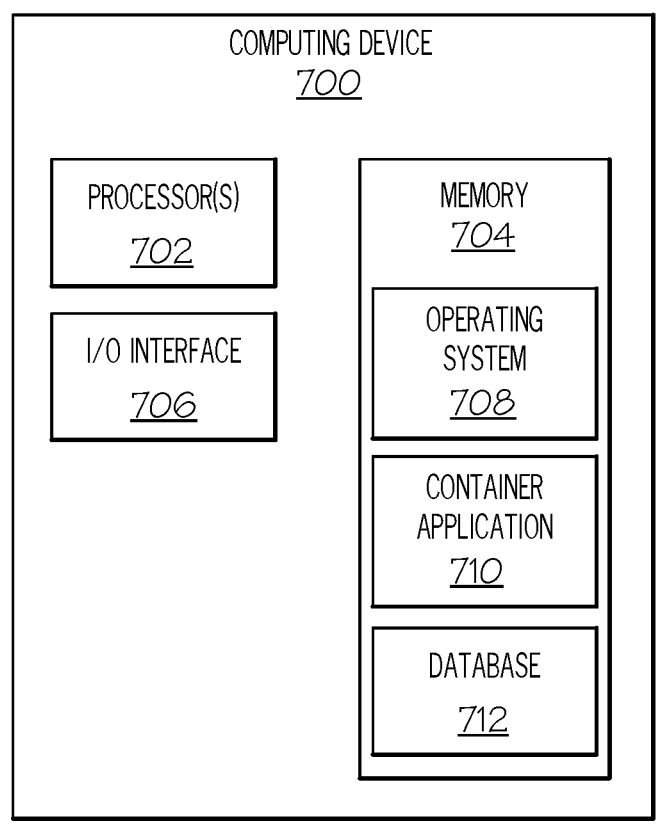
FIG. 7 is a diagram of a computing device configured for processing computer network traffic in a containerized computing environment according to an example embodiment.

FIG. 7 is a diagram of an example computing device 700, according to an example embodiment. The computing device 700 may include one or more processors 702, non-transitory computer readable medium or memory 704, I/O interface devices 706, which may include a network interface for wired or wireless communications. The computer readable medium 704 may store an operating system 708, and a data section 712. The computer readable medium 704 may also store at least one container application 710, for example, web-based software application 500 of FIG. 5, or some or all of the containerized computing environment.

The computing device 700 may be along the path from a network to an end device, e.g., remote computer 112 of FIG. 1, and the application may be constructed and arranged to perform some or all of the method 200 above. An "application" or "module" as used to describe embodiments may refer to a hardware-based module, software-based application or module or may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device 704 of the computer system. An application or module (whether hardware, software, or a combination thereof) may be designed to implement or execute one or more particular described functions or routines. In some embodiments, the computer 700 may be part of a firewall, IPS, or other security device of the containerized computing environment. In other embodiments, the computer 700 is a standalone device that communicates via a wired or wireless connection with the containerized computing environment.

In operation, the processor 702 may execute the application 710 stored in the computer readable medium 704. The application 710 may include software instructions that, when executed by the processor 702, cause the processor 702 to perform operations for applying an appropriate security policy to network traffic to prevent intrusion attempts to the containerized computing environment. In doing so, the computing device 700 may communicate with other electronic devices via the I/O interfaces 706.

Figure 8:
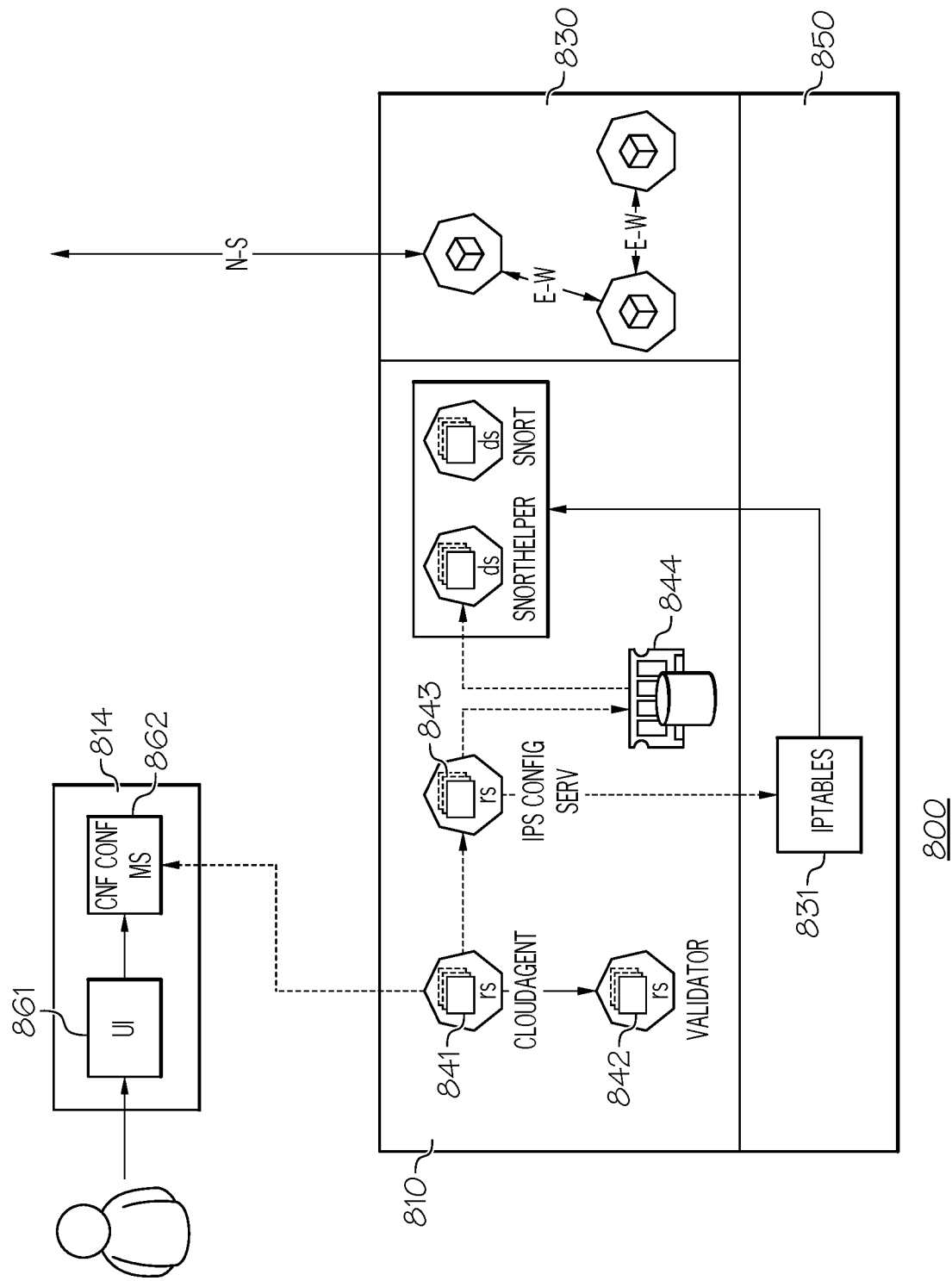
FIG. 8 is a block diagram of selected components of a container IPS system of a containerized computing environment according to another example embodiment.

FIG. 8 is a block diagram of selected components of a container security system 800 of a containerized computing environment, in accordance with some embodiments. Some selected components such as an administrator system 814 includes a user interface 361 and a container firewall configuration module 362 are the same as or similar to the administrator system 314 of FIG. 3 and are not repeated for brevity. Other selected components such as an IPS manager 810 including an administrator interface module 841, validator 842, and an IPS configuration service module 343 and the IP Tables 831 of an operating system kernel 850 are the same as or similar to the IPS manager 810 and kernel 350 of FIG. 3 and are not repeated for brevity.

In FIG. 8, a Snort IPS is described but embodiments may equally apply to other IPS types. During operation, the administrator interface module 841 provides an interface between the administrator system 814 and the cluster(s) 830 for receiving container-related policies and the abovementioned IP Table rules for providing traffic-specific security with respect to the pods of the cluster 850. In some embodiments, the administrator interface module 841 generates rule information pertaining to Snort IPS policies, which is provided as configuration change data to a new cluster. For example, when another cluster is added for management by the container security system 800, default rules are generated and provided by the administrator computer 814 for the new cluster. The configuration change data generated for a user can include a set of Snort IPS rules selected by a set of filters that are part of a default traffic policy, for example, North-South and/or East-West network traffic policy. The filters as part of a policy definition can be used to select signatures of interest from a master signature database (not shown), which may be part of the container security system 300. The filters may be part of a policy definition of a default traffic policy, which may also include the name, description, and/or list of actions to override for specific Snort signatures. The configuration change data can be validated by a validator 842 or the like, e.g., a YANG validator.

In some embodiments, the IPS configuration service module 843 assigns IP addresses of cluster pods to a traffic-specific list of IP addresses, for example, a first list designated for IP addresses of pods having a service type of NodeType or Loadbalancer. The IPS configuration service module 843 can communicate with the administrator interface module 841 to provide the configuration change data to an IP Table 831 of the operating system kernel 850. The IPS configuration service module 843 can also provide the Snort rules to a data structure store 844 such as Remote Dictionary Server (Redis). In some embodiments, the IPS manager 810 includes an IPS assistant container 846. This feature provided by the system 800 can include a Snort helper container application, which runs in the Snort pod and can access and process contents of a Snort log and provide custom rules to a firewall script or the like. In doing so, the IPS assistant container 846 can receive and process the rules from the data structure store 844 and write them to a common volume.

The Snort IPS 845 can detect and protect the cluster(s) 830 against malicious traffic. Snort IPS policies can be applied based on traffic source/destination, for example, North-South (N-S) or East-West (E-W). The Snort IPS 345 communicates with the IPS configuration service module 343 to monitor the cluster pods 351, 352, 353, in particular, monitoring for IP addresses and particular services establishing that the container firewall cluster pods 351-353 are configured to receive North-South and/or East-West network traffic.

As described above, the administrator system 314 can add new clusters under a container orchestration platform and for providing container security features such as traffic policies for the IPS 344. In some embodiments, the administrator system 314 includes a user interface 361 and a container firewall configuration module 362. The user interface 361 permits an administrator or other user to manage the IPS rules, add, remove, or modify clusters, and the like. The container firewall configuration module 362 can generate configuration change data for a cluster. The configuration change data can include IPS rules. The IPS rules can be selected by filters that are part of predetermined traffic policies, for example, established by the administrator.

Figure 9:
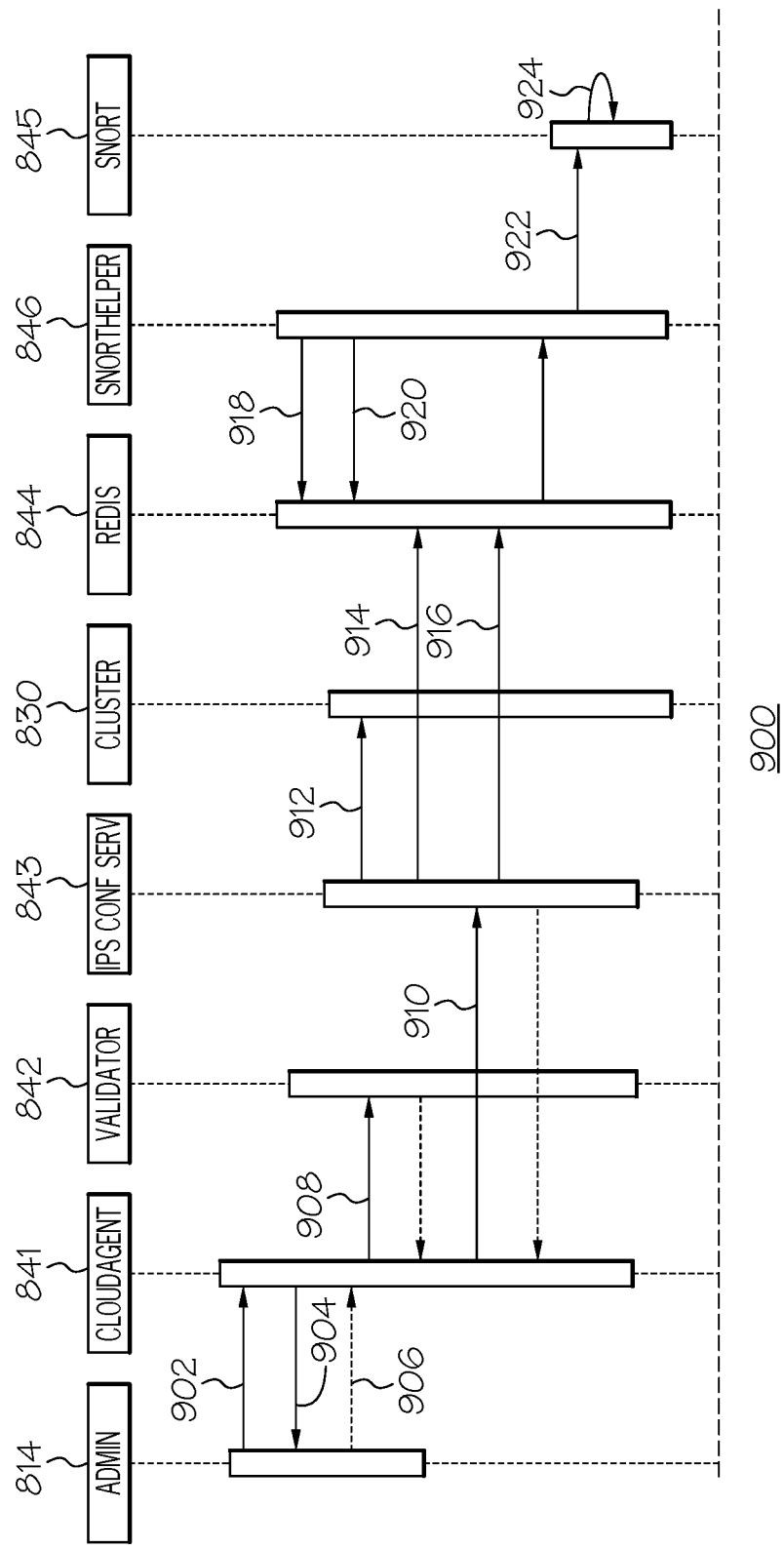
FIG. 9 is an illustration of a method including flow paths between elements of the containerized computing environment of FIG. 8 according to another example embodiment.

FIG. 9 is an illustration of a method 900 including flow paths between elements of the containerized computing environment 800 of FIG. 8.

During operation, configuration change push notification may be provided (902) from the administrator system 814 to the administrator interface module 841, for example, commensurate with an administrator adding a new cluster under a container orchestration platform. For example, a container firewall cluster can be added to a plurality of present containers deployed in a container orchestration environment for providing functionality intended to protect the workload running on the container orchestration platform.

The administrator interface module 341 may send (904) a configuration change data request to the administrator system 814. In response to the request, the administrator system 814 sends (906) the configuration change data to the administrator interface module 841. The administrator interface module 841 in turn sends a request to the validator 842 to validate (908) the configuration. After the data is validated, the administrator interface module 841 sends (910) one or more Snort rules or the like to the IPS configuration service module 843. The IPS configuration service module 843 may watch (912) for services and IP addresses of the container pods by communicating with an API server or the like of the cluster 830. Event data such as stored configuration data (914) and Snort rules (916) are provided from the IPS configuration service module 843 to the data structure store 844 such as Remote Dictionary Server (Redis). The data structure store 844 also receives (918) subscription event data from the IPS assistant container 846. For example, Snort Subscriber rule ret rules can be made available to subscribers in real-time as they are released. The data structure store 844 also receives (920) a request from the IPS assistant container 846 to provide and process the received configuration and rule set. The IPS assistant container 846 can be subscribed to receive events from the data structure store 844. When receiving an event, the IPS assistant container 846 can read the rules and write them to a common storage volume or the like. The IPS assistant container 846 can generate and output (922) a SIGHUP signal or the like to the Snort IPS 845, which in response can perform (924) a reload operation on the configuration including the traffic-specific policies. For example, when the IPS configuration service module 843 monitors the duster pod IP addresses and assigns the IP addresses of pods to a traffic-specific list of IP addresses, for example, a list designated for IP addresses of pods having a service type of NodeType or Loadbalancer, this information is written to the data structure store 844. This information is also processed by the IPS assistant container 846, which can write a new snort.conf file and output a signal or the like to the snort process 845.

Although the foregoing figures illustrate various embodiments of the disclosed systems and methods, additional and/or alternative embodiments are contemplated as falling within the scope of this disclosure. For example, in one embodiment, this disclosure provides a method for processing computer network traffic, comprising: monitoring, by one or more processors of a computer system, a computing environment including a plurality of containers, wherein the plurality of containers are instantiated within a container-based architecture; determining, for at least one container of the plurality of containers, a service type and an IP address; assigning, by the one or more processors of the computer system, the IP address of the container having the determined service type to a first list of IP addresses; assigning, by the one or more processors of the computer system, an IP address of each of the plurality of containers to a second list of IP addresses; applying, by the one or more processors of the computer system, a first security policy for a first source of network traffic between the at least one container and a device external to the container-based architecture for processing by the at least one container having the determined service type and the IP address assigned to the first list of IP addresses; managing a first traffic flow of the first source of network traffic between the at least one container and the device external to the container-based architecture according to the first security policy, wherein managing the first traffic flow includes generating an alert or preventing the first traffic flow by an intrusion prevention system (IPS) from entering the container-based architecture; applying, by the one or more processors of the computer system, a second security policy for a second source of network traffic between the plurality of containers within the container-based architecture for processing by the containers having the IP addresses assigned to the second list of IP addresses; and managing a second traffic flow of the second source of network traffic between the plurality of containers according to the second security policy, wherein managing the first traffic flow includes generating an alert or preventing the second traffic flow by the IPS from being exchanged between the plurality of containers.

In another embodiment of the method, the first security policy includes an intrusion prevention system (IPS) rule set that is applied to the first source of network traffic in response to a determination that the IP address of the container having the service type is in the first list of IP addresses, and wherein the second security policy includes an intrusion prevention system (IPS) rule set that is applied to the second source of network traffic in response to a determination that the IP address of one of the containers is in the second list of IP addresses.

In a further embodiment of the method, a network computing device of the computing environment in a data flow path of the first or second source of network traffic shares a same IP address or subnet as one of the containers, and the method further comprises: determining, by the one or more processors of the computer system, a traffic profile of the first source of network traffic in response to determining that the same IP address or subnet is in the first list of IP addresses; and determining, by the one or more processors of the computer system, a traffic profile of the second first source of network traffic in response to determining that the same IP address or subnet is in the second list of IP addresses.

In yet another embodiment of the method, a network address translation (NAT) device is along the data flow path, and wherein the method further comprises: identifying, by the one or more processors of the computer system, network traffic received by the NAT device as the first source of network traffic or the second source of network traffic based on a location of an IP address of an intended container recipient in the first list of IP addresses or the second list of IP addresses.

In a further embodiment of the method, the method further comprises: forming a plurality of pods, each pod including at least one container of the plurality of containers, wherein each pod has a same IP address or subnet as the at least one container, and wherein the same IP address or subnet is shared with at least one network computing device of the computing environment; and identifying, by the one or more processors of the computer system, incoming network traffic as the first source of network traffic or the second source of network traffic based on a location of the same IP address or subnet in the first list of IP addresses or the second list of IP addresses.

In another embodiment of the method, the method further comprises adding, by the one or more processors of the computer system, a container firewall cluster to the plurality of containers; generating, by the one or more processors of the computer system, a default rule set for analyzing network traffic directed at the container firewall cluster; detecting, by the one or more processors of the computer system, a source of network traffic directed at the cluster; identifying, by the one or more processors of the computer system, the source of network traffic as one of the first source of network traffic or the second source of network traffic in response to an assignment of an IP address to at least one of the first list of IP addresses or the second list of IP addresses; and replacing, by the one or more processors of the computer system, the default rule set with either the first security policy commensurate with the first source of network traffic in response to a determination of the IP address assigned to the first list of IP addresses or the second security policy commensurate with the second source of network traffic in response to a determination of the IP address assigned to the second list of IP addresses.

In yet another embodiment of the method, the container service type is configured for network traffic external to the cluster.

In yet another embodiment of the method, the first and second security policies include firewall policies for controlling the network traffic between the least one container and the device external to the container-based architecture in a North-South direction or between the plurality of containers in an East-West direction, web application firewall (WAF) policies for protecting web workloads deployed in the plurality of containers, or IPS policies for alerting or removing the network traffic determined to be indicators of malicious activity.

In another embodiment of the method, the method of claim 1, further comprises providing, by the one or more processors of the computer system, a software application that includes a first container and a second container of the plurality of containers, the first container having the service type and a first IP address, the second container having a second IP address; configuring, by the one or more processors of the computer system, the first container to process the first source of network traffic in response to a determination of the first IP address in the first list of IP addresses; configuring, by the one or more processors of the computer system, the second container to process the second source of network traffic in response to a determination of the first IP address in the first list of IP addresses; applying, by the one or more processors of the computer system, the first security policy for the first source of network traffic directed at the first container for processing; and applying, by the one or more processors of the computer system, the second security policy for the second source of network traffic directed at the second container for processing.

In another example, in an embodiment, this disclosure provides a computer system, comprising: one or more processors; one or more memory devices coupled to the one or more processors contain program code executable by the one or more processors; and one or more computer readable storage devices coupled to the one or more processors, wherein the one or more storage devices contains program code executable by the one or more processors via the one or more memory devices to implement a method for processing computer network traffic, the method comprising:

monitoring a computing environment including a plurality of containers, wherein the plurality of containers are instantiated within a container-based architecture; determining, for at least one container of the plurality of containers, a service type and an IP address; assigning, by the one or more processors of the computer system, the IP address of the at least one container having the determined service type to a first list of IP addresses; assigning, by the one or more processors of the computer system, an IP address of each of the containers to a second list of IP addresses; applying, by the one or more processors of the computer system, a first security policy for a first source of network traffic between the at least one container and a device external to the container-based architecture for processing by the container having the determined service type and the IP address assigned to the first list of IP addresses; managing a first traffic flow of the first source of network traffic between the at least one container and the device external to the container-based architecture according to the first security policy, wherein managing the first traffic flow includes generating an alert or preventing the first traffic flow by an intrusion prevention system (IPS) from entering the container-based architecture; applying, by the one or more processors of the computer system, a second security policy for a second source of network traffic between the plurality of containers within the container-based architecture for processing by the containers having the IP addresses assigned to the second list of IP addresses; and managing a second traffic flow of the second source of network traffic between the plurality of containers according to the second security policy, wherein managing the first traffic flow includes generating an alert or preventing the second traffic flow by the IPS from being exchanged between the plurality of containers.

In another embodiment of the computer system, the first security policy includes an IPS rule set that is applied to the first source of network traffic in response to a determination that the IP address of the container having the service type is in the first list of IP addresses, and wherein the second security policy includes an IPS rule set that is applied to the second source of network traffic in response to a determination that the IP address of one of the plurality of containers is in the second list of IP addresses.

In yet another embodiment of the computer system, the network computing device of the computing environment in a data flow path of the first or second source of network traffic shares a same IP address or subnet as one of the plurality of containers, and wherein the method further comprises: determining, by the one or more processors of the computer system, a traffic profile of the first source of network traffic in response to determining that the same IP address or subnet is in the first list of IP addresses; and determining, by the one or more processors of the computer system, a traffic profile of the second first source of network traffic in response to determining that the same IP address or subnet is in the second list of IP addresses.

In a further embodiment of the computer system, the method further comprises: adding, by the one or more processors of the computer system, a container firewall cluster to the plurality of containers; generating, by the one or more processors of the computer system, a default rule set for analyzing network traffic directed at the container firewall cluster; detecting, by the one or more processors of the computer system, a source of network traffic directed at the cluster; identifying, by the one or more processors of the computer system, the source of network traffic as one of the first source of network traffic or the second source of network traffic in response to an assignment of an IP address to at least one of the first list of IP addresses or the second list of IP addresses; and replacing, by the one or more processors of the computer system, the default rule set with either the first security policy commensurate with the first source of network traffic in response to a determination of the IP address assigned to the first list of IP addresses or the second security policy commensurate with the second source of network traffic in response to a determination of the IP address assigned to the second list of IP addresses.

In a further embodiment of the computer system, the first and second security policies include firewall policies for controlling the network traffic between the least one container and the device external to the container-based architecture or between the plurality of containers in an East-West direction, web application firewall (WAF) policies for protecting web workloads deployed in the plurality of containers, or IPS policies for alerting or removing the network traffic determined to be indicators of malicious activity.

In a further embodiment of the computer system, the method further comprises: providing, by the one or more processors of the computer system, a software application that includes a first container and a second container of the plurality of containers, the first container having the service type and a first IP address, the second container having a second IP address; configuring, by the one or more processors of the computer system, the first container to process the first source of network traffic in response to a determination of the first IP address in the first list of IP addresses; configuring, by the one or more processors of the computer system, the second container to process the second source of network traffic in response to a determination of the first IP address in the first list of IP addresses; controlling according to the first security policy the first source of network traffic sent from the device external to the container-based architecture and directed at the first container; and controlling according to the second security policy the second source of network traffic sent from the first container and directed at the second container.

In another example, in an embodiment, this disclosure provides a computer program product for processing computer network traffic, the computer program product comprising: one or more computer readable storage media having computer readable program code collectively stored on the one or more computer readable storage media, the computer readable program code being executed by one or more processors of a computer system to cause the computer system to perform a method for processing computer network traffic, comprising: monitoring a computing environment including a plurality of containers, wherein the plurality of containers are instantiated within a container-based architecture; determining, for at least one of the plurality of containers, a service type and an IP address; assigning the IP address of the at least one container having the determined service type to a first list of IP addresses; applying, by the one or more processors of the computer system, a first security policy for a first source of network traffic between the at least one container and a device external to the container-based architecture for processing by the container having the determined service type and the IP address assigned to the first list of IP addresses; assigning an IP address of each of the containers to a second list of IP addresses; managing a first traffic flow of the first source of network traffic between the at least one container and the device external to the container-based architecture according to the first security policy, wherein managing the first traffic flow includes generating an alert or preventing the first traffic flow by an intrusion prevention system (IPS) from entering the container-based architecture; applying, by the one or more processors of the computer system, a second security policy for a second source of network traffic between the plurality of containers within the container-based architecture for processing by the containers having the IP addresses assigned to the second list of IP addresses; and managing a second traffic flow of the second source of network traffic between the plurality of containers according to the second security policy, wherein managing the first traffic flow includes generating an alert or preventing the second traffic flow by the IPS from being exchanged between the plurality of containers.

In another embodiment of the computer program product, the first security policy includes an IPS rule set that is applied to the first source of network traffic in response to a determination that the IP address of the container having the service type is in the first list of IP addresses, and wherein the second security policy includes an IPS rule set that is applied to the second source of network traffic in response to a determination that the IP address of one of the plurality of containers is in the second list of IP addresses.

In yet another embodiment of the computer program product, a network computing device of the computing environment in a data flow path of the first or second source of network traffic shares a same IP address or subnet as one of the plurality of containers, and wherein the method further comprises: determining, by the one or more processors of the computer system, a traffic profile of the first source of network traffic in response to determining that the same IP address or subnet is in the first list of IP addresses; and determining, by the one or more processors of the computer system, a traffic profile of the second first source of network traffic in response to determining that the same IP address or subnet is in the second list of IP addresses.

In a further embodiment of the computer program product, the method further comprises: adding, by the one or more processors of the computer system, a container firewall cluster to the plurality of containers; generating, by the one or more processors of the computer system, a default rule set for analyzing network traffic directed at the container firewall cluster; detecting, by the one or more processors of the computer system, a source of network traffic directed at the cluster; identifying, by the one or more processors of the computer system, the source of network traffic as one of the first source of network traffic or the second source of network traffic in response to an assignment of an IP address to at least one of the first list of IP addresses or the second list of IP addresses; and replacing, by the one or more processors of the computer system, the default rule set with either the first security policy commensurate with the first source of network traffic in response to a determination of the IP address assigned to the first list of IP addresses or the second security policy commensurate with the second source of network traffic in response to a determination of the IP address assigned to the second list of IP addresses.

In a further embodiment of the computer program product, the first and second security policies include firewall policies for controlling the network traffic between the least one container and the device external to the container-based architecture in a North-South direction or between the plurality of containers in an East-West direction, web application firewall (WAF) policies for protecting web workloads deployed in the plurality of containers, or IPS policies for alerting or removing the network traffic determined to be indicators of malicious activity.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C #.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes, systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general-purpose computer, a special purpose computer, a microprocessor, a network server or switch, or the like.

It is, therefore, apparent that there is provided, in accordance with the various embodiments disclosed herein, methods, systems and computer readable media for applying an appropriate security policy to network traffic to prevent intrusion attempts to the containerized computing environment.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The invention claimed is:

1. A method for processing computer network traffic, comprising:
    monitoring, by one or more processors of a computer system, a computing environment including a plurality of containers, wherein the plurality of containers is instantiated within a container-based architecture;
    determining, for at least one container of the plurality of containers, a service type and an IP address;
    assigning, by the one or more processors of the computer system, the IP address of the at least one container of the plurality of containers having the determined service type to a first list of IP addresses;
    assigning, by the one or more processors of the computer system, an IP address of each of the plurality of containers to a second list of IP addresses;
    applying, by the one or more processors of the computer system, a first security policy for a first source of network traffic between the at least one container and a device external to the container-based architecture for processing by the at least one container having the determined service type and the IP address assigned to the first list of IP addresses;
    managing a first traffic flow of the first source of network traffic between the at least one container and the device external to the container-based architecture according to the first security policy, wherein managing the first traffic flow includes generating an alert or preventing the first traffic flow by an intrusion prevention system (IPS) from entering the container-based architecture;
    applying, by the one or more processors of the computer system, a second security policy for a second source of network traffic between the plurality of containers within the container-based architecture for processing by the containers having the IP addresses assigned to the second list of IP addresses; and
    managing a second traffic flow of the second source of network traffic between the plurality of containers according to the second security policy, wherein managing the first traffic flow includes generating an alert or preventing, by the IPS, the second traffic flow from being exchanged between the plurality of containers within the monitored container-based architecture.

2. The method of claim 1, wherein the first security policy includes an IPS rule set that is applied to the first source of network traffic in response to a determination that the IP address of the container having the service type is in the first list of IP addresses, and wherein the second security policy includes an IPS rule set that is applied to the second source of network traffic in response to a determination that the IP address of one of the containers is in the second list of IP addresses.

3. The method of claim 1, wherein a network computing device of the computing environment in a data flow path of the first or second source of network traffic shares a same IP address or subnet as one of the containers, and wherein the method further comprises:
    determining, by the one or more processors of the computer system, a traffic profile of the first source of network traffic in response to determining that the same IP address or subnet is in the first list of IP addresses; and
    determining, by the one or more processors of the computer system, a traffic profile of the second source of network traffic in response to determining that the same IP address or subnet is in the second list of IP addresses.

4. The method of claim 3, wherein the network computing device in the data flow path is a network address translation (NAT) device.

5. The method of claim 1, further comprising:
    forming a plurality of pods, each pod including one or more containers of the plurality of containers, wherein each pod has a same IP address or subnet as the one or more containers, and wherein the same IP address or subnet is shared with at least one network computing device of the computing environment; and
    identifying, by the one or more processors of the computer system, incoming network traffic as the first source of network traffic or the second source of network traffic based on a location of the same IP address or subnet in the first list of IP addresses or the second list of IP addresses.

6. The method of claim 1, further comprising:
    adding, by the one or more processors of the computer system, a container firewall cluster to the plurality of containers;

generating, by the one or more processors of the computer system, a default rule set for analyzing network traffic directed at the container firewall cluster;

detecting, by the one or more processors of the computer system, a source of network traffic directed at the container firewall cluster;

identifying, by the one or more processors of the computer system, the source of network traffic as one of the first source of network traffic or the second source of network traffic in response to an assignment of an IP address to at least one of the first list of IP addresses or the second list of IP addresses; and replacing, by the one or more processors of the computer system, the default rule set with either the first security policy commensurate with the first source of network traffic in response to a determination of the IP address assigned to the first list of IP addresses or the second security policy commensurate with the second source of network traffic in response to a determination of the IP address assigned to the second list of IP addresses.

7. The method of claim 6, wherein the container service type is configured for network traffic external to the container firewall cluster.

8. The method of claim 1, wherein the first and second security policies include firewall policies for controlling the network traffic between the at least one container and the device external to the container-based architecture in a North-South direction or between the plurality of containers in an East-West direction, web application firewall (WAF) policies for protecting web workloads deployed in the plurality of containers, or IPS policies for alerting or removing the network traffic determined to be indicators of malicious activity.

9. The method of claim 1, further comprising:

providing, by the one or more processors of the computer system, a software application that includes a first container and a second container of the plurality of containers, the first container having the service type and a first IP address, the second container having a second IP address;

configuring, by the one or more processors of the computer system, the first container to process the first source of network traffic in response to a determination of the first IP address in the first list of IP addresses;

configuring, by the one or more processors of the computer system, the second container to process the second source of network traffic in response to a determination of the second IP address in the second list of IP addresses;

controlling according to the first security policy the first source of network traffic sent from the device external to the container-based architecture and directed at the first container; and controlling according to the second security policy the second source of network traffic sent from the first container and directed at the second container.

10. A computer system for processing computer network traffic, comprising:

one or more processors;

one or more memory devices coupled to the one or more processors containing program code executable by the one or more processors;

one or more computer readable storage devices coupled to the one or more processors, wherein the one or more storage devices contains program code executable by the one or more processors via the one or more memory devices to implement a method for processing the computer network traffic, the method comprising:

monitoring a computing environment including a plurality of containers, wherein the plurality of containers is instantiated within a container-based architecture;

determining, for at least one container of the plurality of containers, a service type and an IP address;

assigning, by the one or more processors of the computer system, the IP address of the at least one container of the plurality of containers having the determined service type to a first list of IP addresses;

assigning, by the one or more processors of the computer system, the IP address of each of the containers to a second list of IP addresses;

applying, by the one or more processors of the computer system, a first security policy for a first source of network traffic between the at least one container and a device external to the container-based architecture for processing by the container having the determined service type and the IP address assigned to the first list of IP addresses;

managing a first traffic flow of the first source of network traffic between the at least one container and the device external to the container-based architecture according to the first security policy, wherein managing the first traffic flow includes generating an alert or preventing the first traffic flow by an intrusion prevention system (IPS) from entering the container-based architecture;

applying, by the one or more processors of the computer system, a second security policy for a second source of network traffic between the plurality of containers within the container-based architecture for processing by the containers having the IP addresses assigned to the second list of IP addresses; and managing a second traffic flow of the second source of network traffic between the plurality of containers according to the second security policy, wherein managing the first traffic flow includes generating an alert or preventing, by the IPS, the second traffic flow from being exchanged between the plurality of containers within the monitored container-based architecture.

11. The computer system of claim 10, wherein the first security policy includes an IPS rule set that is applied to the first source of network traffic in response to a determination that the IP address of the container having the service type is in the first list of IP addresses, and wherein the second security policy includes an IPS rule set that is applied to the second source of network traffic in response to a determination that the IP address of one of the plurality of containers is in the second list of IP addresses.

12. The computer system of claim 10, wherein a network computing device of the computing environment in a data flow path of the first or second source of network traffic shares a same IP address or subnet as one of the plurality of containers, and wherein the method further comprises:

determining, by the one or more processors of the computer system, a traffic profile of the first source of network traffic in response to determining that the same IP address or subnet is in the first list of IP addresses; and determining, by the one or more processors of the computer system, a traffic profile of the second first source of network traffic in response to determining that the same IP address or subnet is in the second list of IP addresses.

13. The computer system of claim 10, wherein the method further comprises:

adding, by the one or more processors of the computer system, a container firewall cluster to the plurality of containers;

generating, by the one or more processors of the computer system, a default rule set for analyzing network traffic directed at the container firewall cluster;

detecting, by the one or more processors of the computer system, a source of network traffic directed at the cluster;

identifying, by the one or more processors of the computer system, the source of network traffic as one of the first source of network traffic or the second source of network traffic in response to an assignment of an IP address to at least one of the first list of IP addresses or the second list of IP addresses; and replacing, by the one or more processors of the computer system, the default rule set with either the first security policy commensurate with the first source of network traffic in response to a determination of the IP address assigned to the first list of IP addresses or the second security policy commensurate with the second source of network traffic in response to a determination of the IP address assigned to the second list of IP addresses.

14. The computer system of claim 10, wherein the first and second security policies include firewall policies for controlling the network traffic between the at least one container and the device external to the container-based architecture in a North-South direction or between the plurality of containers in an East-West direction, web application firewall (WAF) policies for protecting web workloads deployed in the plurality of containers, or IPS policies for alerting or removing the network traffic determined to be indicators of malicious activity.

15. The computer system of claim 10, wherein the method further comprises:

providing, by the one or more processors of the computer system, a software application that includes a first container and a second container of the plurality of containers, the first container having the service type and a first IP address, the second container having a second IP address;

configuring, by the one or more processors of the computer system, the first container to process the first source of network traffic in response to a determination of the first IP address in the first list of IP addresses;

configuring, by the one or more processors of the computer system, the second container to process the second source of network traffic in response to a determination of the second IP address in the second list of IP addresses;

controlling according to the first security policy the first source of network traffic sent from the device external to the container-based architecture and directed at the first container; and controlling according to the second security policy the second source of network traffic sent from the first container and directed at the second container.

16. A computer program product embodied in one or more non-transitory computer readable storage media having executable computer readable program code for processing computer network traffic, the computer program product comprising:

the computer readable program code being executed by one or more processors of a computer system to cause the computer system to perform a method for processing computer network traffic, comprising:

monitoring a computing environment including a plurality of containers, wherein the plurality of containers is instantiated within a container-based architecture;

determining, for at least one of the plurality of containers, a service type and an IP address;

assigning the IP address of the at least one container of the plurality of containers having the determined service type to a first list of IP addresses;

applying, by the one or more processors of the computer system, a first security policy for a first source of network traffic between the at least one container and a device external to the container-based architecture for processing by the container having the determined service type and the IP address assigned to the first list of IP addresses;

assigning an IP address of each of the containers to a second list of IP addresses;

managing a first traffic flow of the first source of network traffic between the at least one container and the device external to the container-based architecture according to the first security policy, wherein managing the first traffic flow includes generating an alert or preventing the first traffic flow by an intrusion prevention system (IPS) from entering the container-based architecture;

applying, by the one or more processors of the computer system, a second security policy for a second source of network traffic between the plurality of containers within the container-based architecture for processing by the containers having the IP addresses assigned to the second list of IP addresses; and managing a second traffic flow of the second source of network traffic between the plurality of containers according to the second security policy, wherein managing the first traffic flow includes generating an alert or preventing, by the IPS, the second traffic flow from being exchanged between the plurality of containers within the monitored container-based architecture.

17. The computer program product of claim 16, wherein the first security policy includes an IPS rule set that is applied to the first source of network traffic in response to a determination that the IP address of the container having the service type is in the first list of IP addresses, and wherein the second security policy includes an IPS rule set that is applied to the second source of network traffic in response to a determination that the IP address of one of the plurality of containers is in the second list of IP addresses.

18. The computer program product of claim 16, wherein a network computing device of the computing environment in a data flow path of the first or second source of network traffic shares a same IP address or subnet as one of the plurality of containers, and wherein the method further comprises:

determining, by the one or more processors of the computer system, a traffic profile of the first source of network traffic in response to determining that the same IP address or subnet is in the first list of IP addresses; and determining, by the one or more processors of the computer system, a traffic profile of the second first source of network traffic in response to determining that the same IP address or subnet is in the second list of IP addresses.

19. The computer program product of claim 16, wherein the method further comprises:

adding, by the one or more processors of the computer system, a container firewall cluster to the plurality of containers;

generating, by the one or more processors of the computer system, a default rule set for analyzing network traffic directed at the container firewall cluster;

detecting, by the one or more processors of the computer system, a source of network traffic directed at the cluster;

identifying, by the one or more processors of the computer system, the source of network traffic as one of the first source of network traffic or the second source of network traffic in response to the assignment of an IP address to at least one of the first list of IP addresses or the second list of IP addresses;

replacing, by the one or more processors of the computer system, the default rule set with either the first security policy commensurate with the first source of network traffic in response to a determination of the IP address assigned to the first list of IP addresses or the second security policy commensurate with the second source of network traffic in response to a determination of the IP address assigned to the second list of IP addresses.

20. The computer program product of claim 16, wherein the first and second security policies include firewall policies for controlling the network traffic between the least one container and the device external to the container-based architecture in a North-South direction or between the plurality of containers in an East-West direction, web application firewall (WAF) policies for protecting web workloads deployed in the plurality of containers, or IPS policies for alerting or removing the network traffic determined to be indicators of malicious activity.

* * * * *